United States Patent
Yasoshina et al.

(10) Patent No.: US 12,134,977 B2
(45) Date of Patent: Nov. 5, 2024

(54) V-TYPE ENGINE

(71) Applicant: HONDA MOTOR CO., LTD., Tokyo (JP)

(72) Inventors: Sayaka Yasoshina, Saitama (JP); Atsuki Sugihara, Saitama (JP); Mashu Kurata, Saitama (JP); Takahiro Tsuchiyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/547,783

(22) PCT Filed: Feb. 25, 2021

(86) PCT No.: PCT/JP2021/007153
§ 371 (c)(1),
(2) Date: Aug. 24, 2023

(87) PCT Pub. No.: WO2022/180742
PCT Pub. Date: Sep. 1, 2022

(65) Prior Publication Data
US 2024/0133333 A1 Apr. 25, 2024
US 2024/0229700 A9 Jul. 11, 2024

(51) Int. Cl.
*F01N 3/28* (2006.01)
*F01N 13/10* (2010.01)
(Continued)

(52) U.S. Cl.
CPC .............. *F01N 13/10* (2013.01); *F01N 3/28* (2013.01); *F01N 13/14* (2013.01); *F02B 75/228* (2013.01); *F02B 77/11* (2013.01)

(58) Field of Classification Search
CPC .......... F01N 13/10; F01N 13/14; F01N 13/08; F01N 13/1805; F01N 13/141;
(Continued)

(56) References Cited

U.S. PATENT DOCUMENTS 5,494,467 A * 2/1996 Sohgawa ............. B63H 20/245
440/89 R
10,012,144 B2 7/2018 Nakayama
(Continued)

FOREIGN PATENT DOCUMENTS

| JP | S55109851 U | 8/1980 |
|---|---|---|
| JP | S6153527 U | 4/1986 |

(Continued)

OTHER PUBLICATIONS

PCT Written Opinion for Japanese Patent Application PCT/JP2021/007153 mailed May 11, 2021; 8 pp.

*Primary Examiner* — Dapinder Singh
(74) *Attorney, Agent, or Firm* — Armstrong Teasdale LLP

(57) ABSTRACT

[Task] A task is to make a V-type engine compact while suppressing the decrease in the output thereof.
[Solution] A V-type engine 1 includes an engine body (3) including a crankcase (7) configured to rotatably support a crankshaft (11), and a pair of cylinder banks (8, 9) extending from the crankcase (7), a pair of exhaust pipes (31, 32) connected to the pair of cylinder banks (8, 9), a catalyst pipe (34) connected to the pair of exhaust pipes (31, 32), and a catalyst (33) accommodated in the catalyst pipe (34), wherein each of the pair of exhaust pipes (31, 32) is connected to the catalyst pipe (34) on an upstream side of the catalyst (33) in an exhaust direction, and the catalyst pipe (34) is arranged adjacently to the pair of cylinder banks (8, 9).

10 Claims, 11 Drawing Sheets

(51) Int. Cl.
*F01N 13/14* (2010.01)
*F02B 75/22* (2006.01)
*F02B 77/11* (2006.01)

(58) Field of Classification Search
CPC ........ F01N 13/148; F01N 3/28; F02B 75/228;
F02B 75/22; F02B 77/11; Y02T 10/40
See application file for complete search history.

(56) References Cited

U.S. PATENT DOCUMENTS

| | | | |
|---|---|---|---|
| 10,036,299 | B2 | 7/2018 | Achiwa et al. |
| 10,914,211 | B2 * | 2/2021 | Tada ................ F02M 35/10222 |
| 2013/0130577 | A1 * | 5/2013 | Ochiai .................... F01N 13/10 |
| | | | 60/299 |
| 2014/0237997 | A1 * | 8/2014 | Ochiai ..................... F01N 3/10 |
| | | | 60/299 |
| 2018/0010515 | A1 * | 1/2018 | Kolhouse ................ F02D 17/02 |
| 2018/0238255 | A1 * | 8/2018 | Hakeem ................. F02B 47/02 |

FOREIGN PATENT DOCUMENTS

| | | | |
|---|---|---|---|
| JP | S6175019 | A | 4/1986 |
| JP | 2002264872 | A | 9/2002 |
| JP | 2007092663 | A | 4/2007 |
| JP | 2015200297 | A | 11/2015 |
| JP | 2016173070 | A | 9/2016 |

* cited by examiner

V-TYPE ENGINE

CROSS-REFERENCE TO RELATED APPLICATION

This application is a U.S. national stage application of PCT/JP2021/007153, filed on Feb. 25, 2021, which is hereby expressly incorporated by reference in its entirety.

TECHNICAL FIELD

The present invention relates to a V-type engine.

Conventionally, an engine is provided with an exhaust device for discharging exhaust gas generated in a combustion process. The exhaust device includes an exhaust pipe through which the exhaust gas passes, a catalyst configured to purify the exhaust gas, a muffler configured to reduce an exhaust sound of the engine, and the like. For example, the exhaust gas generated in the combustion process passes through the exhaust pipe, the catalyst, and the muffler in this order, and then is discharged to an outside of the engine.

BACKGROUND ART

For example, Patent Document 1 discloses an internal combustion engine including an engine body of horizontally opposed type, a pair of exhaust pipes connected to the engine body, a merging portion connected to the pair of exhaust pipes, and a catalytic converter accommodated in the merging portion.

PRIOR ART DOCUMENT(S)

Patent Document(s)

Patent Document 1: JPS55-109851U

SUMMARY OF THE INVENTION

Task to be Accomplished by the Invention

In Patent Document 1, the pair of exhaust pipes merge in the merging portion that accommodates the catalytic converter. Accordingly, as compared with a case where the pair of exhaust pipes merge on an upstream side of the merging portion, the pressure drop is reduced, so that the decrease in the output of the engine body can be suppressed. However, in Patent Document 1, the merging portion that accommodates the catalytic converter is arranged away from the engine body, which makes it difficult to make the internal combustion engine compact.

In view of the above background, an object of the present invention is to make a V-type engine compact while suppressing the decrease in the output thereof.

Means to Accomplish the Task

To achieve such an object, one aspect of the present invention provides a v-type engine (1), comprising: an engine body (3) including a crankcase (7) configured to rotatably support a crankshaft (11), and a pair of cylinder banks (8, 9) extending from the crankcase; a pair of exhaust pipes (31, 32) connected to the pair of cylinder banks; a catalyst pipe (34) connected to the pair of exhaust pipes; and a catalyst (33) accommodated in the catalyst pipe, wherein each of the pair of exhaust pipes is connected to the catalyst pipe on an upstream side of the catalyst in an exhaust direction, and the catalyst pipe is arranged adjacently to the pair of cylinder banks.

According to this aspect, the pair of exhaust pipes merge in the catalyst pipe. Accordingly, as compared with a case where the pair of exhaust pipes merge on an upstream side of the catalyst pipe, the pressure drop is reduced, so that the decrease in the output of the V-type engine can be suppressed. Further, the catalyst pipe is arranged adjacently to the pair of cylinder banks. Accordingly, the V-type engine can be made more compact than a case where the catalyst pipe is arranged away from the pair of cylinder banks.

In the above aspect, preferably, the catalyst pipe extends in a width direction of the engine body from a distal end side of one of the cylinder banks to a distal end side of another of the cylinder banks, and each of the pair of exhaust pipes is connected to the catalyst pipe on one side of the catalyst in the width direction of the engine body.

According to this aspect, the length of the catalyst pipe is sufficiently secured, so that a relatively large catalyst can be accommodated in the catalyst pipe. Accordingly, the performance of the catalyst for purifying the exhaust gas can be enhanced.

In the above aspect, preferably, the catalyst pipe is arranged within a width (W) of the engine body when viewed in an axial direction of the crankshaft.

According to this aspect, the V-type engine can be made even more compact by arranging the catalyst pipe within the width of the engine body while securing the length of the catalyst pipe.

In the above aspect, preferably, the crankshaft (11) is configured to rotate around a rotation axis (X) extending in a horizontal direction, an output portion (12) of the crankshaft protrudes from a side surface (7a) of the crankcase (7), and the catalyst pipe is arranged above the output portion, and protrudes more sideward than the side surface of the crankcase.

According to this aspect, in a horizontal V-type engine, the catalyst pipe protrudes in the same direction as the output portion of the crankshaft. Accordingly, the layout of other parts is less likely to be restricted by the catalyst pipe.

In the above aspect, preferably, the crankshaft (141) is configured to rotate around a rotation axis (Y) extending in an up-and-down direction, an output portion (142) of the crankshaft protrudes from a lower surface (137a) of the crankcase (137), and the catalyst pipe is arranged higher than the lower surface of the crankcase.

According to this aspect, in a vertical V-type engine, it is possible to prevent the catalyst pipe from protruding lower than the lower surface of the crankcase. Accordingly, in a case where an engine mount is arranged below the crankcase, the interference between the catalyst pipe and the engine mount can be suppressed.

In the above aspect, preferably, the v-type engine further comprises: an air cleaner (4) arranged between the pair of cylinder banks; and a thermal insulation member (39) arranged between the catalyst pipe and the air cleaner, wherein the thermal insulation member is fixed to the catalyst pipe and the pair of cylinder banks.

According to this aspect, by arranging the thermal insulation member between the catalyst pipe and the air cleaner, it is possible to suppress the air cleaner from receiving the thermal influence from the catalyst pipe. Further, by fixing the thermal insulation member to the catalyst pipe and the pair of cylinder banks, the catalyst pipe can be fixed to the engine body in good balance via the thermal insulation member. Accordingly, it is not necessary to fix the catalyst pipe to a frame around the engine body, which makes it easy to fix the catalyst pipe.

In the above aspect, preferably, the v-type engine further comprises: a first reinforcement member (37) fixed to the pair of exhaust pipes; and a second reinforcement member (38) fixed to the catalyst pipe and one of the exhaust pipes, wherein the thermal insulation member is fixed to the pair of cylinder banks together with the first reinforcement member and the second reinforcement member.

According to this aspect, the first and second reinforcement members can be used to increase the strength for fixing the catalyst pipe to the engine body.

In the above aspect, preferably, the V-type engine (131) further comprises: a support member (145) fixed to the pair of cylinder banks; and a fixed member (148) fixed to one of the cylinder banks, wherein one side portion of the catalyst pipe in a longitudinal direction thereof is provided with a fixed stay (169) fixed to the fixed member, and both side portions of the catalyst pipe in the longitudinal direction thereof are provided with: a pair of fixed pieces (170) fixed to the pair of cylinder banks; and a pair of bosses (171) fixed to the support member.

According to this aspect, the catalyst pipe can be fixed to the engine body in good balance using a simple configuration. Accordingly, it is not necessary to fix the catalyst pipe to a frame around the engine body, which makes it easy to fix the catalyst pipe.

In the above aspect, preferably, the v-type engine further comprises an oxygen sensor (35) configured to detect oxygen concentrations of an exhaust gas discharged from the pair of exhaust pipes, wherein the catalyst pipe is provided with a pair of inlet ports (58, 59) to which the pair of exhaust pipes are connected, the pair of inlet ports being arranged at an interval in a width direction of the engine body, and the oxygen sensor is arranged between the pair of inlet ports with respect to the width direction of the engine body, and attached to a surface of the catalyst pipe facing the pair of inlet ports.

According to this aspect, the oxygen sensor can accurately detect the oxygen concentrations of the exhaust gas discharged from both exhaust pipes.

In the above aspect, preferably, an exhaust port (19) opens on each of the cylinder banks, and an inner diameter of the pair of exhaust pipes and an inner diameter of the catalyst pipe are larger than an inner diameter of the exhaust port.

According to this aspect, the pressure drop can be more effectively reduced, so that the decrease in the output of the V-type engine can be more effectively suppressed.

In the above aspect, preferably, each of the cylinder banks is provided with a temperature sensor configured to detect a temperature thereof.

According to this aspect, the completion of warming up of the engine body can be detected at precise timing. Accordingly, after warming up of the engine body is completed, the air-fuel ratio can quickly shift to a thin side (lean side). Accordingly, it is possible to suppress the exhaust gas containing harmful components at a high rate from being discharged from the engine body.

Effect of the Invention

Thus, according to the above aspects, it is possible to make a V-type engine compact while suppressing the decrease in the output thereof.

MODE(S) FOR CARRYING OUT THE INVENTION

The First Embodiment

<V-Type Engine 1>

Figure 1:
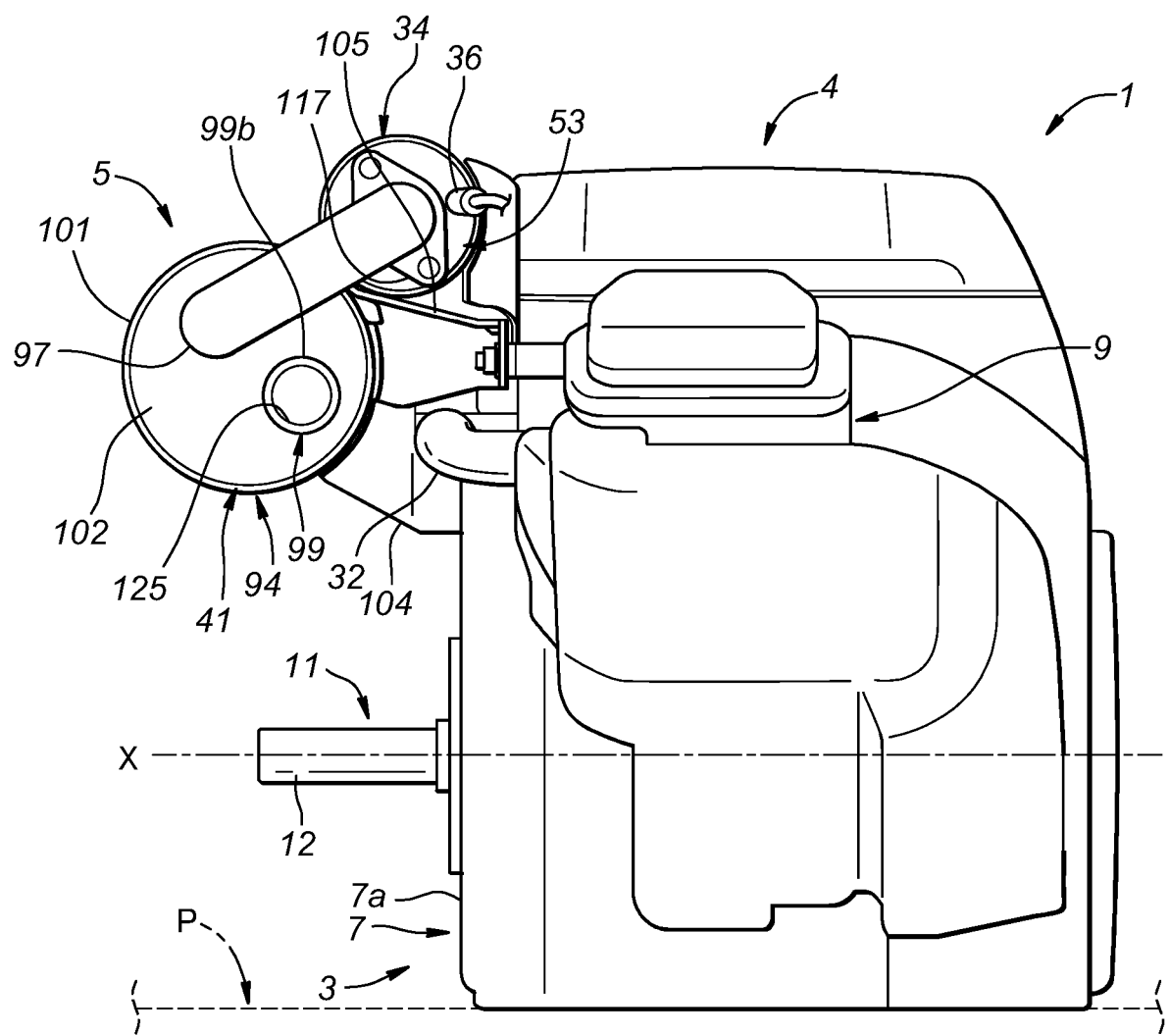
FIG. 1 is a side view showing a V-type engine according to the first embodiment of the present invention.

First, a horizontal V-type engine 1 (hereinafter abbreviated as "engine 1") as an internal combustion engine according to the first embodiment of the present invention will be described with reference to FIGS. 1 to 7. Hereinafter, for convenience of explanation, a right side in FIG. 1 is defined as a front side of the engine 1. Further, in this specification, when an expression like "fixed by bolt(s) (not shown)" is used, a member may be fixed by normal bolt(s) having a screw on only one side or by stud bolt(s) having screws on both sides.

Figure 2:
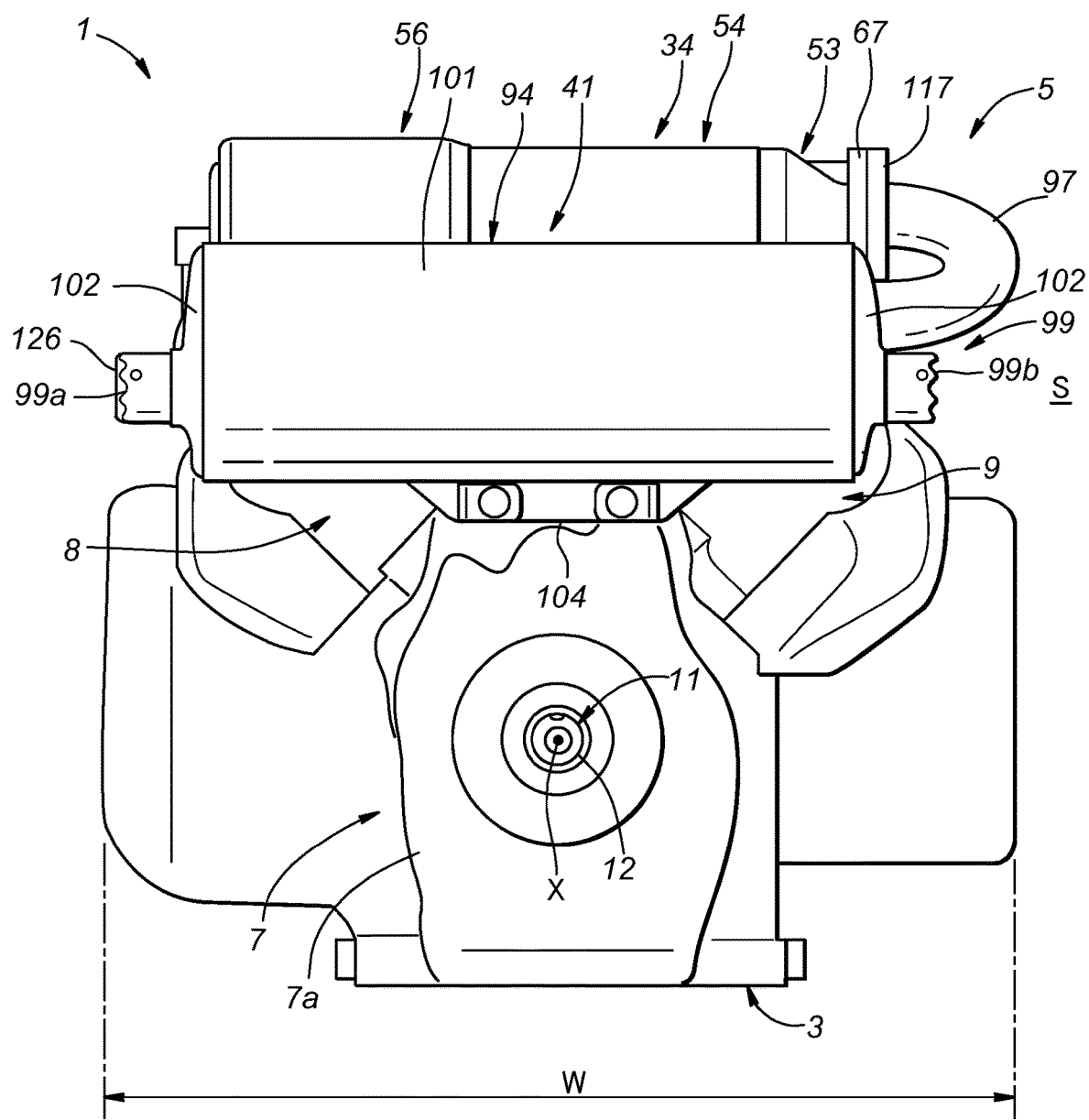
FIG. 2 is a rear view showing the V-type engine according to the first embodiment of the present invention.

With reference to FIGS. 1 and 2, the engine 1 consists of a general-purpose engine used as a power source of a work machine P. For example, the work machine P consists of a cutting machine such as a concrete cutter, a floor treatment machine such as a floor leveler, a high-pressure washer, a generator, or the like. The engine 1 consists of an OHV air-cooled engine including two cylinders. In another embodiment, the engine 1 may consist of an engine (for example, an OHC engine) other than an OHV engine, an engine (for example, a water-cooled engine) other than an air-cooled engine, or an engine including three or more cylinders.

The engine 1 includes an engine body 3, an air cleaner 4 arranged above the engine body 3, an exhaust device 5 arranged on an upper rear side of the engine body 3. In the following, these components of the engine 1 will be described in order.

<Engine Body 3>

Figure 3:
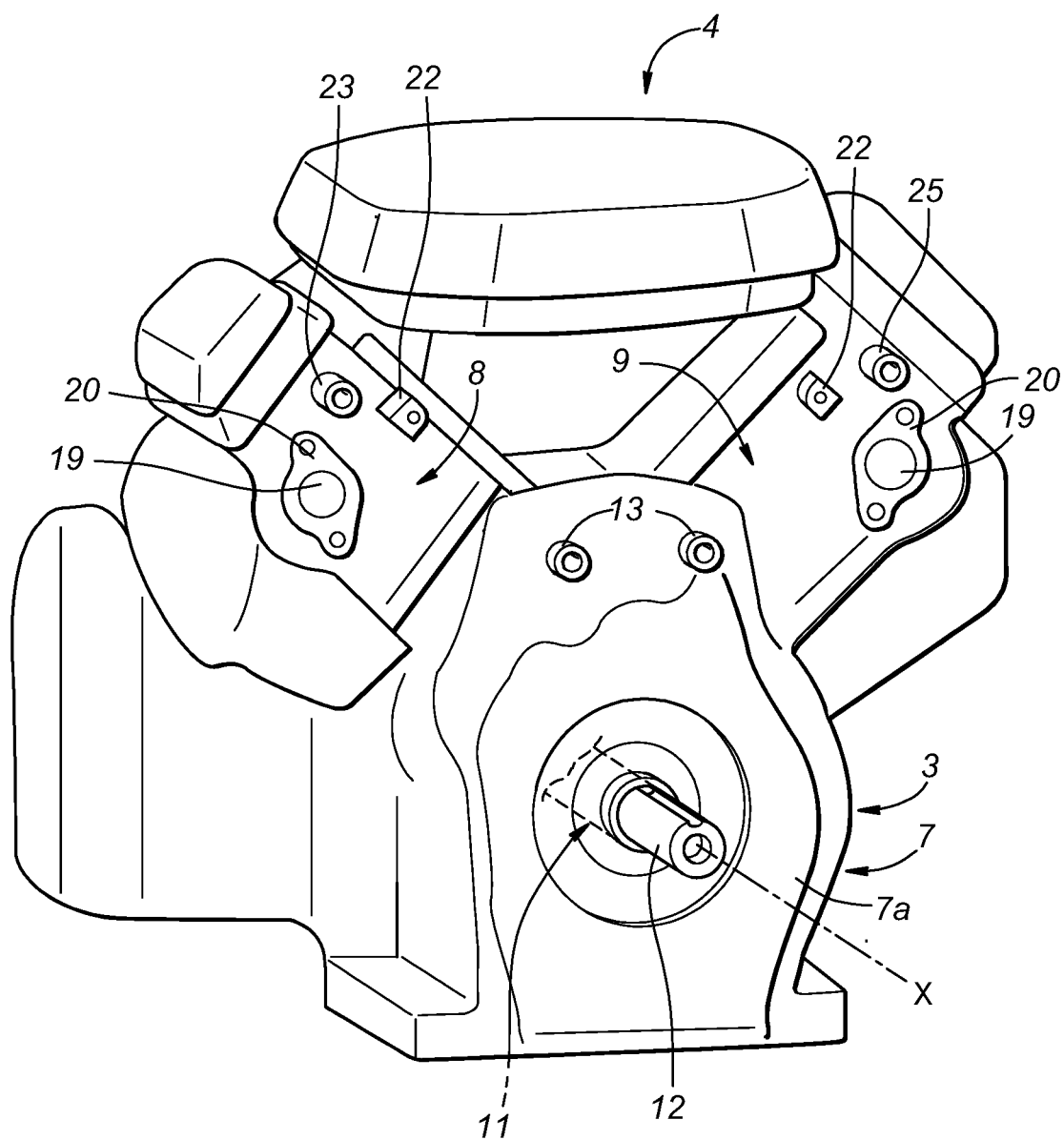
FIG. 3 is a perspective view showing an engine body and an air cleaner according to the first embodiment of the present invention.
Figure 4:
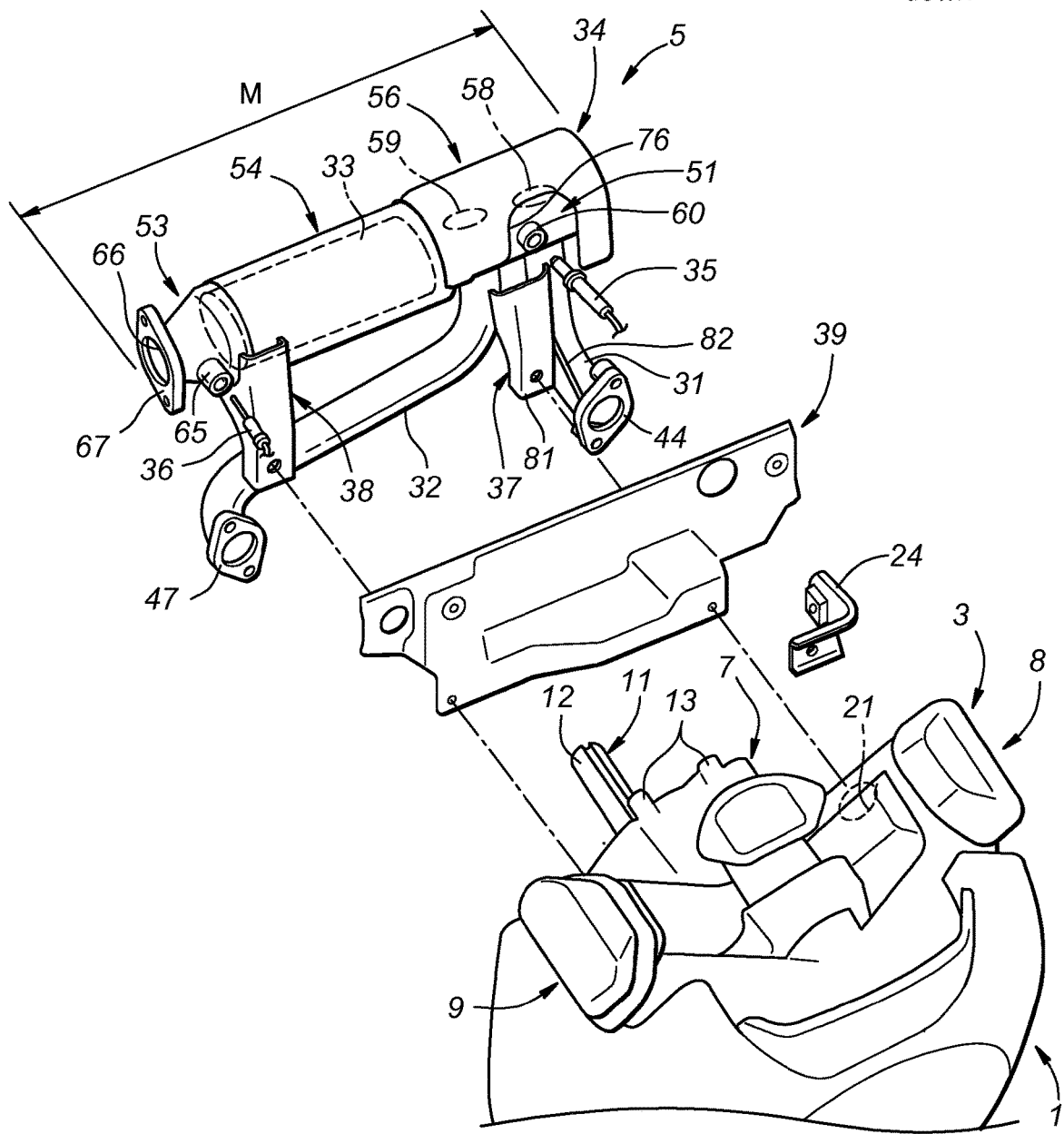
FIG. 4 is an exploded perspective view showing the V-type engine according to the first embodiment of the present invention.

With reference to FIGS. 3 and 4, the engine body 3 includes a crankcase 7, a first cylinder bank 8 extending to an upper right side from the crankcase 7, and a second cylinder bank 9 extending to an upper left side from the crankcase 7.

A crankshaft 11 is rotatably supported by a central portion of the crankcase 7. The crankshaft 11 is configured to rotate around a rotation axis X extending in the front-and-rear direction. That is, the engine 1 consists of a horizontal engine in which the rotation axis X of the crankshaft 11 extends in the horizontal direction. A power take-off shaft 12 (PTO shaft: an example of an output portion) is provided at a rear end of the crankshaft 11. The PTO shaft 12 is connected to a work unit of the work machine P (for example, a blade of the concrete cutter), and the work unit of the work machine P is configured to rotate according to the rotation of the PTO shaft 12. The PTO shaft 12 protrudes rearward from a rear surface 7*a* (one side surface) of the crankcase 7 and extends in the front-and-rear direction. A pair of left and right first fixed bosses 13 are provided on an upper portion of the rear surface 7*a* of the crankcase 7.

The first and second cylinder banks 8, 9 are aligned in the lateral direction (the width direction of the engine body 3). Each of the first and second cylinder banks 8, 9, is provided diagonally above the crankcase 7.

In a lower portion (cylinder) of each of the first and second cylinder banks 8, 9, a piston (not shown) is accommodated so as to reciprocate. The piston is connected to the crankshaft 11 via a connecting rod (not shown).

An upper portion (cylinder head) of each of the first and second cylinder banks 8, 9 defines a combustion chamber (not shown) together with the piston. On a laterally inner surface of the upper portion of each of the first and second cylinder banks 8, 9, an intake port (not shown) communicating with the combustion chamber opens. On a rear surface of the upper portion of each of the first and second cylinder banks 8, 9, an exhaust port 19 communicating with the combustion chamber opens and a flange surface 20 is formed around the exhaust port 19. In the upper portion of the first cylinder bank 8, a temperature sensor 21 (see FIG. 4) configured to detect temperature thereof is arranged. In another embodiment, temperature sensors 21 may be arranged in both the first and second cylinder banks 8 and 9, or may not be arranged in either of the first and second cylinder banks 8 and 9.

On the rear surface of the upper portion of each of the first and second cylinder banks 8 and 9, a second fixed boss 22 is provided on a laterally inner side of the flange surface 20. On the rear surface of the upper portion of the first cylinder bank 8, a third fixed boss 23 is provided above the flange surface 20. An L-shaped attachment plate 24 (see FIG. 4) is fixed to the third fixed boss 23 by a bolt (not shown). On the rear surface of the upper portion of the second cylinder bank 9, a fourth fixed boss 25 is provided above the flange surface 20.

<Air Cleaner 4>

With reference to FIG. 3, the air cleaner 4 has a flat shape (flat plate-like shape) elongated in the lateral direction and the front-and-rear direction. The air cleaner 4 is arranged between the first and second cylinder banks 8, 9 of the engine body 3. The air cleaner 4 is connected to the intake port (not shown) of each of the first and second cylinder banks 8, 9 via an intake pipe (not shown), and thus the air cleaned by the air cleaner 4 is introduced into the combustion chamber (not shown) via the intake port.

<Exhaust Device 5>

The exhaust device 5 is a device configured to discharge the exhaust gas discharged from the engine body 3 to an outside of the engine 1. Hereinafter, an expression "upstream" and an expression "downstream" indicate "upstream" and "downstream" in an exhaust direction (namely, a direction in which the exhaust gas flows inside the exhaust device 5) respectively. One-dot chain line arrows appropriately attached to each figure indicate the exhaust direction.

Figure 5:
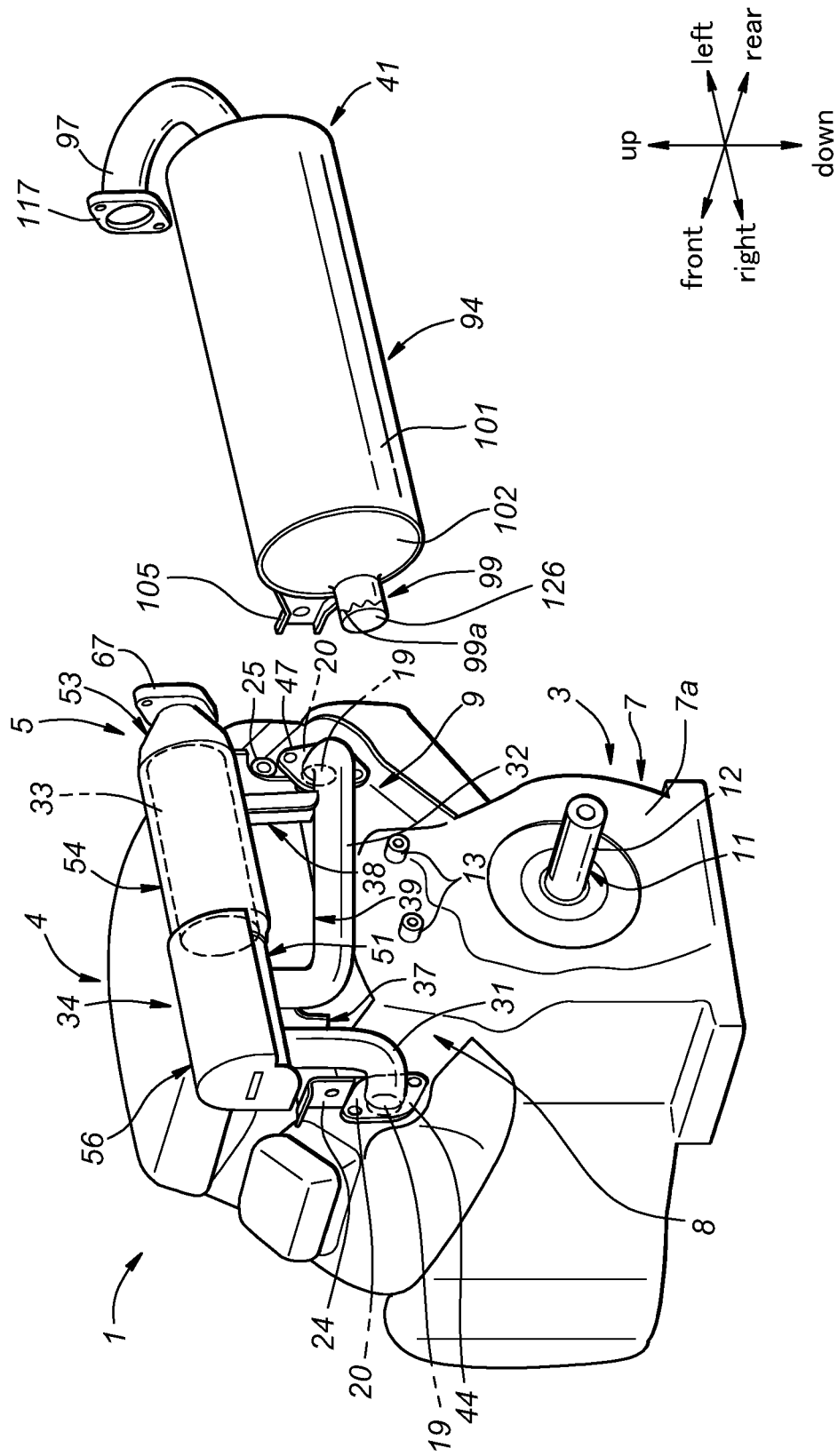
FIG. 5 is an exploded perspective view showing the V-type engine according to the first embodiment of the present invention.

With reference to FIGS. 4 and 5, the exhaust device 5 includes first and second exhaust pipes 31, 32, a catalyst 33, a catalyst pipe 34, an oxygen sensor 35, a temperature sensor 36, first and second reinforcement members 37, 38, a thermal insulation member 39, and a muffler 41 for the engine 1 (hereinafter abbreviated as "muffler 41"). In the following, these components of the exhaust device 5 will be described in order.

<First and Second Exhaust Pipes 31, 32>

With reference to FIGS. 4 and 5, the first and second exhaust pipes 31, 32 of the exhaust device 5 are arranged at a rear side of the engine body 3 and aligned in the lateral direction. An inner diameter of each of the first and second exhaust pipes 31, 32 is larger than an inner diameter of the exhaust port 19 of each of the first and second cylinder banks 8 and 9. The second exhaust pipe 32 is longer than the first exhaust pipe 31.

The first exhaust pipe 31 curves and extends from a lower side to an upper side. On an outer circumference of a lower end (upstream end) of the first exhaust pipe 31, a first fixed flange 44 is provided. The first fixed flange 44 is fixed to the flange surface 20 of the first cylinder bank 8 by a pair of bolts (not shown). Accordingly, the lower end of the first exhaust pipe 31 is connected to the exhaust port 19 of the first cylinder bank 8.

A left portion (upstream portion) of the second exhaust pipe 32 curves and extends from a left side to a right side. A laterally central portion of the second exhaust pipe 32 extends linearly from a left side to a right side. A right portion (downstream portion) of the second exhaust pipe 32 curves and extends from a lower side to an upper side. On an outer circumference of a left end (upstream end) of the second exhaust pipe 32, a second fixed flange 47 is provided. The second fixed flange 47 is fixed to the flange surface 20 of the second cylinder bank 9 by a pair of bolts (not shown). Accordingly, the left end of the second exhaust pipe 32 is connected to the exhaust port 19 of the second cylinder bank 9.

<Catalyst 33>

With reference to FIGS. 4 and 5, the catalyst 33 of the exhaust device 5 has a columnar shape elongated in the lateral direction. That is, in the present embodiment, the longitudinal direction of the catalyst 33 matches the lateral direction. For example, the catalyst 33 consists of a ternary catalyst. The catalyst 33 is configured to purify the exhaust gas by changing a harmful substance in the exhaust gas, which is discharged from the engine body 3 via the first and second exhaust pipes 31, 32, into a harmless substance by a chemical reaction.

<Catalyst Pipe 34>

With reference to FIG. 1, the catalyst pipe 34 of the exhaust device 5 is arranged adjacently to the air cleaner 4 on a rear side of the air cleaner 4. The catalyst pipe 34 is arranged above the PTO shaft 12, and protrudes more rearward (sideward) than the rear surface 7*a* (one side surface) of the crankcase 7. An outer surface (a surface facing away from a surface opposed to the engine body 3) of the catalyst pipe 34 is covered with a cover (not shown).

With reference to FIG. 2, the catalyst pipe 34 is arranged adjacently to the first and second cylinder banks 8 and 9. The catalyst pipe 34 extends in the lateral direction from an upper end side (distal end side) of the first cylinder bank 8 to an upper end side (distal end side) of the second cylinder bank 9. When viewed in the front-and-rear direction (axial direction of the crankshaft 11), the catalyst pipe 34 is arranged within a width W of the engine body 3.

Figure 6:
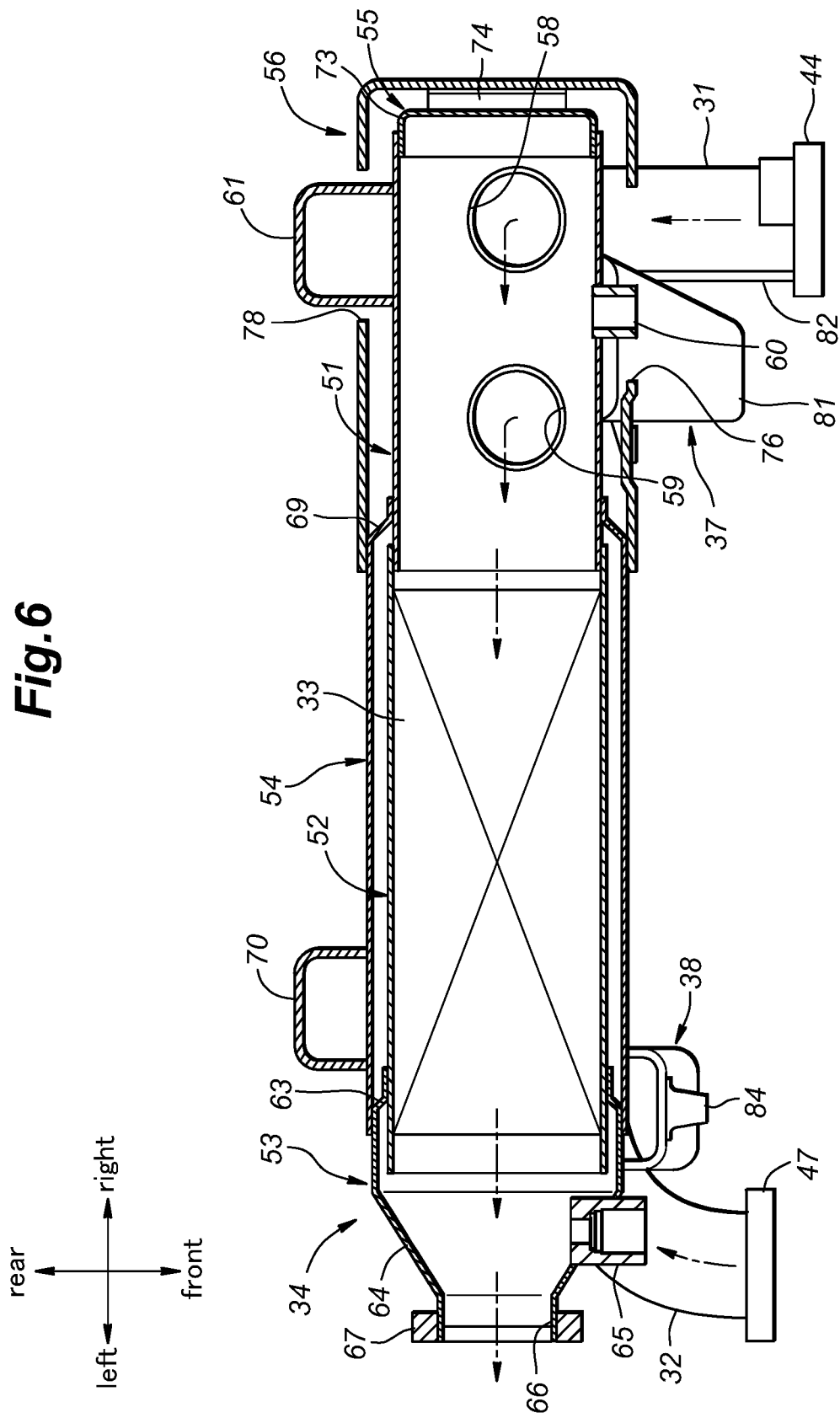
FIG. 6 is a cross-sectional view showing a catalyst pipe according to the first embodiment of the present invention.

With reference to FIGS. 4 to 6, the catalyst pipe 34 has a cylindrical shape (an example of a tubular shape) elongated in the lateral direction. That is, in the present embodiment, the longitudinal direction of the catalyst pipe 34 matches the lateral direction. In another embodiment, the catalyst pipe 34 may have a shape (for example, a polygonal tubular shape) other than a cylindrical shape. The catalyst pipe 34 is arranged on a downstream side of the first and second exhaust pipes 31, 32. The catalyst pipe 34 accommodates the catalyst 33.

The catalyst pipe 34 includes an inlet tubular body 51, an inner tubular body 52, an outlet tubular body 53, an outer tubular body 54, a lid body 55, and a cover body 56. An arrow M in FIG. 4 indicates a lateral range (a range from a left end of the outlet tubular body 53 to a right end of the cover body 56) of the catalyst pipe 34. Inner diameters of the inlet tubular body 51, the inner tubular body 52, and the outlet tubular body 53 (namely, inner diameters of portions of the catalyst pipe 34 through which the exhaust gas flows) are larger than an inner diameter of the exhaust port 19 of each of the first and second cylinder banks 8 and 9.

The inlet tubular body 51 extends in the lateral direction. On a lower surface of the inlet tubular body 51, first and second inlet ports 58, 59 of the exhaust gas are arranged at intervals in the lateral direction. On a right side (upstream side) of the catalyst 33, an upper end (downstream end) of the first exhaust pipe 31 is connected to the first inlet port 58. On a right side (upstream side) of the catalyst 33, a right end (downstream end) of the second exhaust pipe 32 is connected to the second inlet port 59.

On a front surface (a surface opposed to the first and second inlet ports 58, 59) of the inlet tubular body 51, a first attachment boss 60 is provided. The first attachment boss 60 is arranged more leftward than the first inlet port 58 and more rightward than the second inlet port 59. That is, the first attachment boss 60 is arranged between the first inlet port 58 and the second inlet port 59 in the lateral direction. On an outer circumferential surface of the inlet tubular body 51, a fixed piece 61 protrudes rearward. Incidentally, the fixed piece 61 is omitted from the drawings except FIG. 6.

The inner tubular body 52 extends in the lateral direction. The inner tubular body 52 is arranged on a left side (downstream side) of the inlet tubular body 51. An inner circumference of a right end of the inner tubular body 52 is fixed to an outer circumference of a left end of the inlet tubular body 51 by welding. The inner tubular body 52 covers an outer circumference of the catalyst 33. An inner circumferential surface of the inner tubular body 52 is fixed to an outer circumferential surface of the catalyst 33 by welding.

The outlet tubular body 53 extends in the lateral direction. The outlet tubular body 53 is arranged on a left side (downstream side) of the inner tubular body 52. On a right portion of the outlet tubular body 53, a first diameter reduced portion 63 is provided. The diameter of the first diameter reduced portion 63 is reduced from a left side (downstream side) to a right side (upstream side). At a right side (upstream side) of the first diameter reduced portion 63, a left portion of the inner tubular body 52 is fitted into a right end of the outlet tubular body 53 so as to slide relative to the right end of the outlet tubular body 53. In a laterally central portion of the outlet tubular body 53, a tapered portion 64 is provided. The diameter of the tapered portion 64 is reduced from a right side (upstream side) to a left side (downstream side). On a front surface of the tapered portion 64, a second attachment boss 65 is provided. At a left end of the outlet tubular body 53, an outlet port 66 of the exhaust gas is provided. On an outer circumference of the outlet port 66, a connecting flange 67 is provided. The connecting flange 67 is fixed to the left end of the outlet tubular body 53 by welding.

The outer tubular body 54 extends in the lateral direction. The outer tubular body 54 is arranged on an outer circumference of the inner tubular body 52. In a right portion of the outer tubular body 54, a second diameter reduced portion 69 is provided. The diameter of the second diameter reduced portion 69 is reduced from a left side (downstream side) to a right side (upstream side). On a right side (upstream side) of the second diameter reduced portion 69 and a portion where the inlet tubular body 51 and the inner tubular body 52 are welded, an inner circumference of a right end of the outer tubular body 54 is fixed to an outer circumference of a left portion of the inlet tubular body 51 by welding. On a left side (downstream side) of the first diameter reduced portion 63 of the outlet tubular body 53, an inner circumference of a left end of the outer tubular body 54 is fixed to an outer circumference of a right portion of the outlet tubular body 53 by welding. On an outer circumferential surface of the outer tubular body 54, a fixed piece 70 protrudes rearward. Incidentally, the fixed piece 70 is omitted from the drawings except FIG. 6.

The lid body 55 includes a closing piece 73 and a protruding piece 74 protruding rightward from the closing piece 73. The closing piece 73 is fixed to an inner circumference of a right end (upstream end) of the inlet tubular body 51 by welding. Accordingly, the lid body 55 covers the right end of the inlet tubular body 51. The protruding piece 74 is fixed to the closing piece 73 by welding.

The cover body 56 extends in the lateral direction. The cover body 56 is arranged on an outer circumference of the inlet tubular body 51. A right end (upstream end) of the cover body 56 is fixed to the protruding piece 74 of the lid body 55 by welding. On a left side (downstream side) of the second diameter reduced portion 69 of the outer tubular body 54, a left end (downstream end) of the cover body 56 is fixed to an outer circumference of a right portion of the outer tubular body 54 by welding.

On a front surface of the cover body 56, a notch 76 is provided at a position corresponding to the first attachment boss 60 of the inlet tubular body 51. On a rear surface of the cover body 56, a hole 78 is provided at a position corresponding to the fixed piece 61 of the inlet tubular body 51. Incidentally, the hole 78 is omitted from the drawings except FIG. 6.

<Oxygen Sensor 35>

With reference to FIG. 4, the oxygen sensor 35 of the exhaust device 5 is a sensor configured to detect the concentration of oxygen in the exhaust gas discharged from the engine body 3 via the first and second exhaust pipes 31, 32. The oxygen sensor 35 is arranged on a right side (upstream side) of the catalyst 33. The oxygen sensor 35 is attached to the first attachment boss 60 of the inlet tubular body 51 of the catalyst pipe 34, and arranged between the first inlet port 58 and the second inlet port 59 of the inlet tubular body 51 in the lateral direction.

<Temperature Sensor 36>

With reference to FIG. 4, the temperature sensor 36 of the exhaust device 5 is a sensor configured to detect the temperature of the exhaust gas that has passed through the catalyst 33. For example, driving of the engine 1 stops when the temperature of the exhaust gas detected by the temperature sensor 36 exceeds a prescribed threshold, so that the catalyst 33 can be protected. That is, the temperature sensor 36 is a sensor for protecting the catalyst 33. The temperature sensor 36 is arranged on a left side (downstream side) of the catalyst 33. The temperature sensor 36 is attached to the second attachment boss 65 of the outlet tubular body 53 of the catalyst pipe 34.

<First and Second Reinforcement Members 37, 38>

With reference to FIGS. 4 and 5, the first and second reinforcement members 37, 38 of the exhaust device 5 are arranged at a rear side of the engine body 3 and aligned in the lateral direction. The first and second reinforcement members 37, 38 are arranged between the catalyst pipe 34 and the thermal insulation member 39.

The first reinforcement member 37 includes a base portion 81 extending in the up-and-down direction and a protruding portion 82 protruding forward from a lower right portion of the base portion 81. A right portion of the first reinforcement member 37 is fixed to an outer circumferential surface of the first exhaust pipe 31 by welding. A left portion of the first reinforcement member 37 is fixed to an outer circumferential surface of the second exhaust pipe 32 by welding.

The second reinforcement member 38 extends in the up-and-down direction. An upper portion of the second reinforcement member 38 is fixed to outer circumferential surfaces of the outlet tubular body 53 and the outer tubular body 54 of the catalyst pipe 34 by welding. A lower portion of the second reinforcement member 38 is fixed to the outer circumferential surface of the second exhaust pipe 32 by welding.

<Thermal Insulation Member 39>

With reference to FIGS. 4 and 5, the thermal insulation member 39 of the exhaust device 5 is arranged at a rear side of the engine body 3 and extends in the lateral direction. The thermal insulation member 39 is arranged between the catalyst pipe 34 and the air cleaner 4.

An upper right portion of the thermal insulation member 39 is fixed to the cover body 56 of the catalyst pipe 34 by a bolt (not shown). A lower right portion of the thermal insulation member 39, together with a lower portion of the base portion 81 of the first reinforcement member 37, is fixed to the second fixed boss 22 (see FIG. 3) of the first cylinder bank 8 by a bolt (not shown). An upper left portion of the thermal insulation member 39 is fixed to an upper portion of the second reinforcement member 38 by a bolt (not shown). A lower left portion of the thermal insulation member 39, together with the lower portion of the second reinforcement member 38, is fixed to the second fixed boss 22 (see FIG. 3) of the second cylinder bank 9 by a bolt (not shown).

<Muffler 41>

Figure 7:
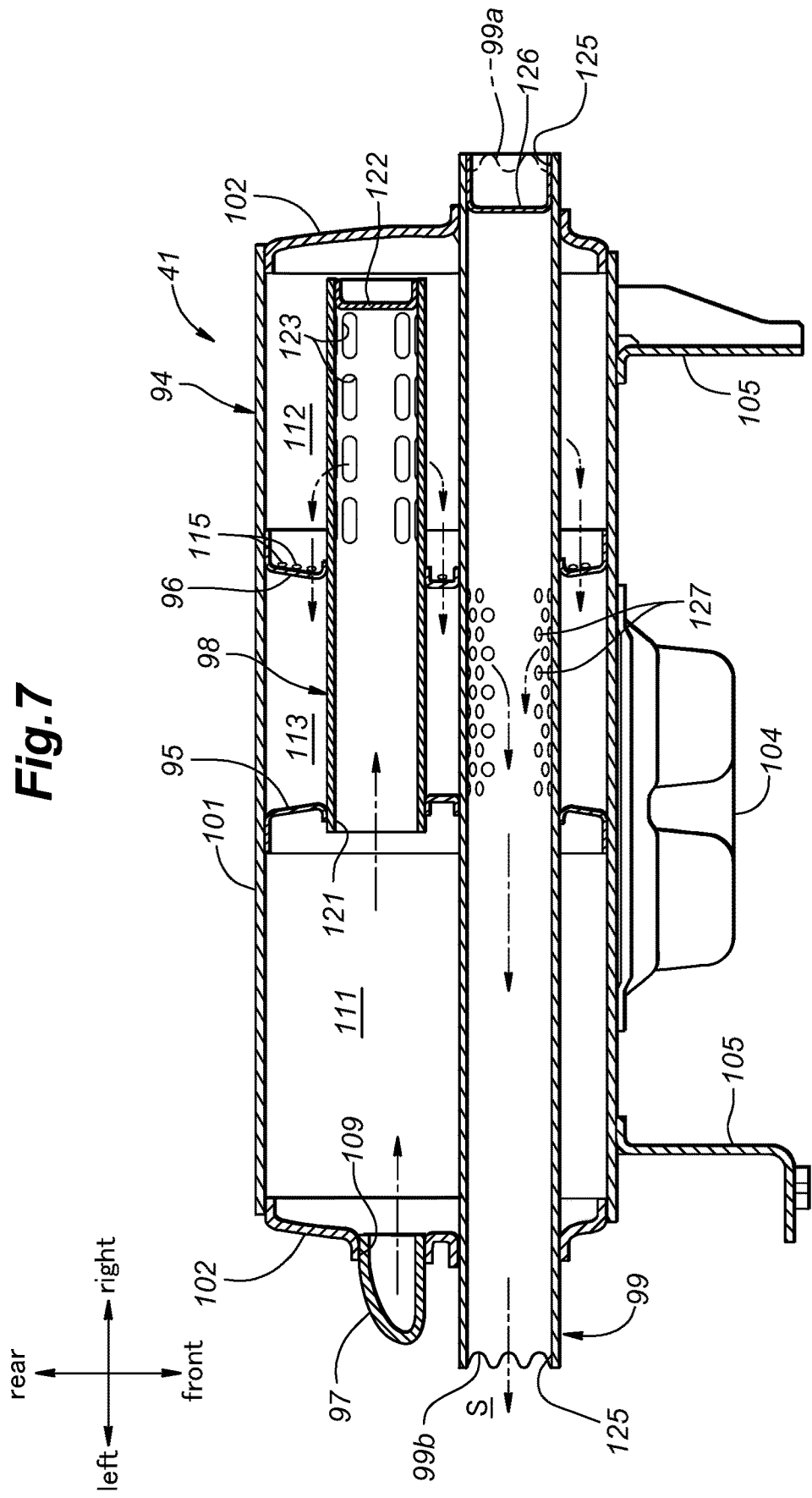
FIG. 7 is a cross-sectional view showing a muffler according to the first embodiment of the present invention.

With reference to FIGS. 1 and 2, the muffler 41 of the exhaust device 5 is arranged on a downstream side of the catalyst pipe 34. The muffler 41 is not welded to the catalyst pipe 34, and is separable from the catalyst pipe 34. In another embodiment, the muffler 41 may be fixed to the catalyst pipe 34 by welding or the like. With reference to FIGS. 5 and 7, the muffler 41 includes a muffler body 94, a plurality of partition walls 95, 96, an inflow pipe 97, a communication pipe 98, and a discharge pipe 99.

With reference to FIG. 1, the muffler body 94 is arranged adjacently to the catalyst pipe 34 on a lower rear side of the catalyst pipe 34. The muffler body 94 protrudes more rearward (sideward) than the rear surface 7a (one side surface) of the crankcase 7. An outer surface (a surface facing away from a surface opposed to the engine body 3) of the muffler body 94 is covered with the abovementioned cover (not shown).

With reference to FIG. 2, the muffler body 94 is arranged parallel to the catalyst pipe 34, and extends in the lateral direction from the upper end side (distal end side) of the first cylinder bank 8 to the upper end side (distal end side) of the second cylinder bank 9. When viewed in the front-and-rear direction, an upper portion of the muffler body 94 overlaps with a lower portion of the catalyst pipe 34. When viewed in the front-and-rear direction, both lateral side portions of the muffler body 94 overlap with the upper portions of the first and second cylinder banks 8 and 9. When viewed in the front-and-rear direction, the muffler body 94 is arranged within the width W of the engine body 3.

With reference to FIGS. 5 and 7, the muffler body 94 has a cylindrical shape (an example of a tubular shape) elongated in the lateral direction. That is, in the present embodiment, the longitudinal direction of the muffler body 94 matches the lateral direction. In another embodiment, the muffler body 94 may have a shape (for example, a polygonal tubular shape) other than a cylindrical shape.

The muffler body 94 includes a tubular portion 101 extending in the lateral direction and a pair of lid portions 102 (left and right lid portions 102) covering openings 101A at both lateral ends of the tubular portion 101. In a laterally central portion on an outer circumferential surface of the tubular portion 101, a fixed bracket 104 protrudes forward. The fixed bracket 104 is fixed to the pair of left and right first fixed bosses 13 of the crankcase 7 by a pair of bolts (not shown). In both lateral side portions of the outer circumferential surface of the tubular portion 101, a pair of left and right fixed stays 105 protrude forward. The right fixed stay 105 is fixed to the attachment plate 24, which is fixed to the first cylinder bank 8, by a bolt (not shown). The left fixed stay 105 is fixed to the fourth fixed boss 25 of the second cylinder bank 9 by a bolt (not shown). On an outer circumferential surface of the tubular portion 101, a pair of left and right fixed pieces (not shown) protrude. The right fixed piece is fixed to the fixed piece 61 of the inlet tubular body 51 of the catalyst pipe 34 by a bolt (not shown). The left fixed piece is fixed to the fixed piece 70 of the outer tubular body 54 of the catalyst pipe 34 by a bolt (not shown).

A plurality of muffling chambers 111 to 113 is formed inside the muffler body 94. The muffling chambers 111 to 113 include a first muffling chamber 111 formed at a left end of the muffler body 94, a second muffling chamber 112 formed at a right end of the muffler body 94, and a third muffling chamber 113 formed between the first muffling chamber 111 and the second muffling chamber 112. Volumes of the muffling chambers 111 to 113 become smaller in order of "a volume of the first muffling chamber 111, a volume of the second muffling chamber 112, and a volume of the third muffling chamber 113". That is, a formula "the volume of the first muffling chamber 111>the volume of the second muffling chamber 112>the volume of the third muffling chamber 113" is satisfied. An inflow port 109 of the exhaust gas is provided at a left end of the first muffling chamber 111. The inflow port 109 consists of a hole provided in the left lid portion 102.

The partition walls 95 and 96 include a first partition wall 95 laterally partitioning the first muffling chamber 111 and the third muffling chamber 113, and a second partition wall 96 laterally partitioning the second muffling chamber 112 and the third muffling chamber 113. The second partition wall 96 is provided with multiple small holes 115 over the entire area thereof, and the second muffling chamber 112 and the third muffling chamber 113 communicate with each other via these multiple small holes 115.

The inflow pipe 97 is arranged on a left side (outer side in the width direction of the engine body 3) of the muffler body 94. The inflow pipe 97 curves in a U shape to protrude to a left side (outer side in the width direction of the engine body 3). At a front end (upstream end) of the inflow pipe 97, a connecting flange 117 is provided. The connecting flange 117 is fixed to the connecting flange 67 of the outlet tubular body 53 of the catalyst pipe 34 by a pair of bolts (not shown). A rear end (downstream end) of the inflow pipe 97 is connected to the inflow port 109 of the first muffling chamber 111 of the muffler body 94. A pipe cover (not shown) is attached to an outer circumferential surface of the inflow pipe 97.

The communication pipe 98 extends in the lateral direction. The communication pipe 98 penetrates the first and second partition walls 95, 96 to be supported by the first and second partition walls 95, 96. At a left end (upstream end) of the communication pipe 98, a communication port 121 communicating with the first muffling chamber 111 is provided. To a right end (downstream end) of the communication pipe 98, a cap 122 is fixed by welding. Accordingly, the right end of the communication pipe 98 is covered with the cap 122. On an outer circumferential portion of the communication pipe 98, multiple communication holes 123 communicating with the second muffling chamber 112 are provided. According to the above configuration, the first muffling chamber 111 and the second muffling chamber 112 communicate with each other via the communication pipe 98.

The discharge pipe 99 extends in the lateral direction. The discharge pipe 99 penetrates the pair of lid portions 102 of the muffler body 94 and the first and second partition walls 95, 96 to be supported by the pair of lid portions 102 of the muffler body 94 and the first and second partition walls 95, 96. On an outer circumferential portion of the discharge pipe 99, multiple outer circumferential holes 127 communicating with the third muffling chamber 113 are provided. The left and right ends of the discharge pipe 99 protrude to both lateral sides of the muffler body 94. At left and right ends of the discharge pipe 99, a pair of openings 125 are formed. To the opening 125 formed at the right end of the discharge pipe 99, a lid member 126 is fixed by welding. Accordingly, the opening 125 formed at the right end of the discharge pipe 99 is closed by the lid member 126. The opening 125 formed at the left end of the discharge pipe 99 is not closed by a lid member 126 and communicates with an external space S on a left side of the muffler body 94. According to the above configuration, the third muffling chamber 113 and the external space S on the left side of the muffler body 94 communicate with each other via the discharge pipe 99.

A right edge 99a of the discharge pipe 99 is provided on an outer circumference of the opening 125 formed at the right end of the discharge pipe 99, and a left edge 99b (downstream edge) of the discharge pipe 99 is provided on an outer circumference of the opening 125 formed at the left end of the discharge pipe 99. The left and right edges 99a and 99b of the discharge pipe 99 protrude to both lateral sides of the muffler body 94.

<Flow of the Exhaust Gas>

When the engine 1 is driven, the exhaust gas is discharged from the exhaust ports 19 of the first and second cylinder banks 8 and 9. The exhaust gas discharged from the exhaust ports 19 passes through the first and second exhaust pipes 31, 32, and then flows into the inlet tubular body 51 of the catalyst pipe 34 via the first and second inlet ports 58, 59. The exhaust gas that has flowed into the inlet tubular body 51 of the catalyst pipe 34 passes through the inlet tubular body 51, the inner tubular body 52, and the outlet tubular body 53 of the catalyst pipe 34 in this order, and is then discharged from the outlet tubular body 53 of the catalyst pipe 34 via the outlet port 66. In this way, the exhaust gas passes through the catalyst pipe 34, and thus the exhaust gas is purified by the catalyst 33 accommodated in the catalyst pipe 34.

The exhaust gas discharged from the outlet tubular body 53 of the catalyst pipe 34 flows into the inflow pipe 97 of the muffler 41. The exhaust gas that has flowed into the inflow pipe 97 passes through the inflow pipe 97, and then flows into the first muffling chamber 111 of the muffler 41 via the inflow port 109. The exhaust gas that has flowed into the first muffling chamber 111 passes through the first muffling chamber 111, and then flows into the communication pipe 98 of the muffler 41 via the communication port 121. The exhaust gas that has flowed into the communication pipe 98 passes through the communication pipe 98, and then flows into the second muffling chamber 112 of the muffler 41 via the multiple communication holes 123. The exhaust gas that has flowed into the second muffling chamber 112 passes through the second muffling chamber 112, and then flows into the third muffling chamber 113 of the muffler 41 via the multiple small holes 115 of the second partition wall 96. The exhaust gas that has flowed into the third muffling chamber 113 passes through the third muffling chamber 113, and then flows into the discharge pipe 99 of the muffler 41 via the multiple outer circumferential holes 127. The exhaust gas that has flowed into the discharge pipe 99 passes through the discharge pipe 99, and is then discharged from the opening 125 formed at the left end of the discharge pipe 99 to the external space S on the left side of the muffler body 94. In this way, the exhaust gas passes through the muffler 41, and thus the exhaust sound is reduced.

<The Effect of the First Embodiment>

The first and second exhaust pipes 31, 32 are connected to the catalyst pipe 34 on a right side (upstream side) of the catalyst 33, respectively. In this way, the first and second exhaust pipes 31, 32 merge in the catalyst pipe 34. Accordingly, as compared with a case where the first and second exhaust pipes 31, 32 merge on an upstream side of the catalyst pipe 34, the pressure drop is reduced, so that the decrease in the output of the engine 1 can be suppressed. Further, the catalyst pipe 34 is arranged adjacently to the first and second cylinder banks 8, 9. Accordingly, the engine 1 can be made more compact than a case where the catalyst pipe 34 is arranged away from the first and second cylinder banks 8, 9.

Further, the catalyst pipe 34 extends in the lateral direction (width direction of the engine body 3) from the upper end side (distal end side) of the first cylinder bank 8 to the upper end side (distal end side) of the second cylinder bank 9. By adopting such a configuration, the length of the catalyst pipe 34 is sufficiently secured, so that a relatively large catalyst 33 can be accommodated in the catalyst pipe 34. Accordingly, the performance of the catalyst 33 for purifying the exhaust gas can be enhanced.

Further, when viewed in the front-and-rear direction (an axial direction of the crankshaft 11), the catalyst pipe 34 is arranged within the width W of the engine body 3. By adopting such a configuration, the engine 1 can be made more compact.

Further, the PTO shaft 12 protrudes rearward (sideward) from the rear surface 7a (side surface) of the crankcase 7, and the catalyst pipe 34 is arranged above the PTO shaft 12 and protrudes rearward from the rear surface 7a of the crankcase 7. By adopting such a configuration, in a horizontal engine 1, the catalyst pipe 34 protrudes in the same direction as the PTO shaft 12. Accordingly, the layout of other parts is less likely to be restricted by the catalyst pipe 34.

Further, the thermal insulation member 39 is arranged between the catalyst pipe 34 and the air cleaner 4. Accordingly, it is possible to suppress the air cleaner 4 from receiving the thermal influence from the catalyst pipe 34. Further, the thermal insulation member 39 is fixed to the catalyst pipe 34 and the first and second cylinder banks 8, 9. Accordingly, the catalyst pipe 34 can be fixed to the engine body 3 in good balance via the thermal insulation member 39. Accordingly, it is not necessary to fix the catalyst pipe 34 to a frame around the engine body 3, which makes it easy to fix the catalyst pipe 34. In another embodiment, the catalyst pipe 34 may be fixed to both the engine body 3 and a frame around the engine body 3, or may be fixed only to a frame around the engine body 3.

Further, the thermal insulation member 39 is fixed to the first and second cylinder banks 8, 9 together with the first and second reinforcement members 37, 38. By adopting such a configuration, the first and second reinforcement members 37, 38 can be used to increase the strength for fixing the catalyst pipe 34 to the engine body 3.

Further, the oxygen sensor 35 is arranged between the first and second inlet ports 58, 59 with respect to the lateral direction (width direction of the engine body 3), and attached to the surface of the catalyst pipe 34 facing the first and second inlet ports 58, 59. By adopting such a configuration, the oxygen sensor 35 can accurately detect the oxygen concentrations of the exhaust gas discharged from both the first and second exhaust pipes 31, 32.

Further, the first attachment boss 60 to which the oxygen sensor 35 is attached is provided on a front surface (namely, a surface other than a bottom surface) of the catalyst pipe 34. By adopting such a configuration, it is possible to prevent water from collecting in the first attachment boss 60, so that the oxygen sensor 35 is less likely to fail.

Further, the inner diameter of the first and second exhaust pipes 31, 32 and the inner diameter of the catalyst pipe 34 are larger than the inner diameter of the exhaust ports 19 of the first and second cylinder banks 8, 9. By adopting such a configuration, the pressure drop can be more effectively reduced, so that the decrease in the output of the engine 1 can be more effectively suppressed.

Further, in the upper portion of the first cylinder bank 8, the temperature sensor 21 configured to detect the temperature thereof is arranged. By adopting such a configuration, the completion of warming up of the engine body 3 can be detected at precise timing. Accordingly, after warming up of the engine body 3 is completed, the air-fuel ratio can quickly shift to a thin side (lean side). Accordingly, it is possible to suppress the exhaust gas containing harmful components at a high rate from being discharged from the engine body 3.

Further, the outlet port 66 of the exhaust gas opens in the catalyst pipe 34, and the connecting flange 67 connected to the muffler 41 is provided on the outer circumference of the outlet port 66. By adopting such a configuration, the muffler 41 can be easily attached to the catalyst pipe 34, so that any muffler 41 can be selected according to the use of the engine 1.

The Second Embodiment

<V-Type Engine 131>

Figure 8:
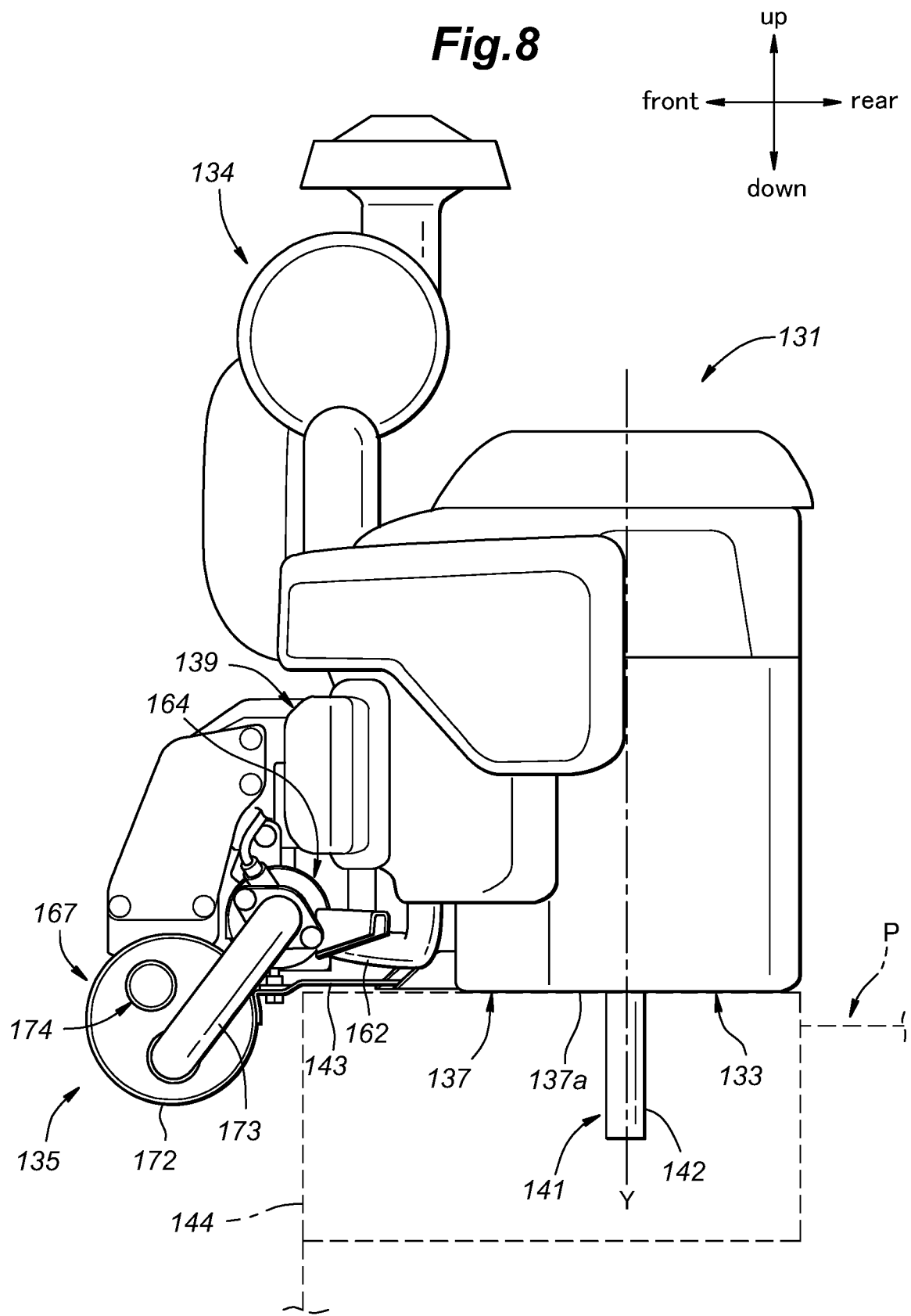
FIG. 8 is a side view showing a V-type engine according to the second embodiment of the present invention.

In the following, a vertical V-type engine 131 (hereinafter abbreviated as "engine 131") according to the second embodiment of the present invention will be described with reference to FIGS. 8 to 11. Hereinafter, for convenience of explanation, a left side in FIG. 8 is defined as a front side of the engine 131. The descriptions overlapping with those of the first embodiment will be omitted as appropriate.

Figure 9:
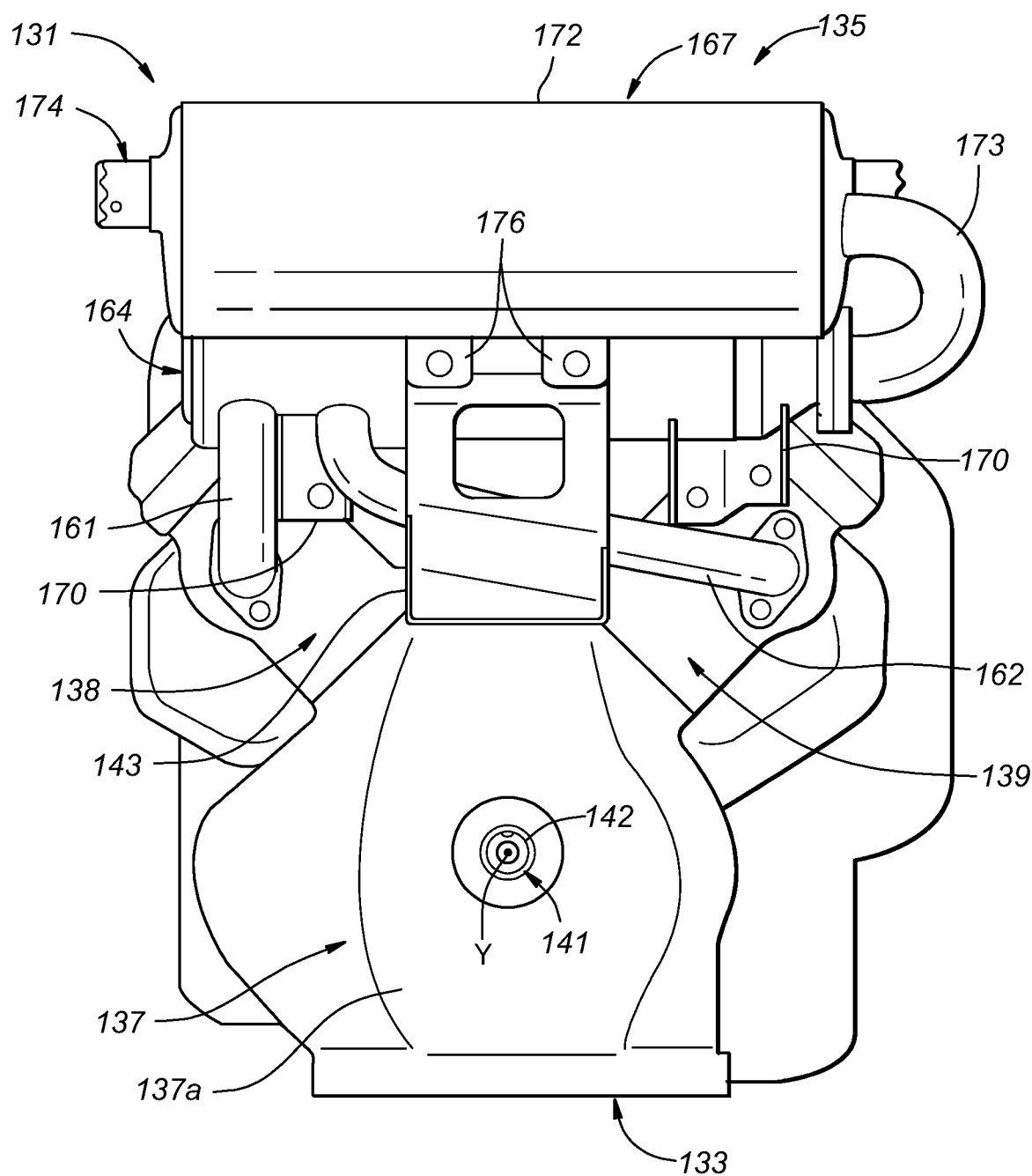
FIG. 9 is a bottom view showing the V-type engine according to the second embodiment of the present invention.

With reference to FIGS. 8 and 9, the engine 131 includes an engine body 133, an air cleaner 134 arranged above the engine body 133, and an exhaust device 135 arranged on a lower front side of the engine body 133. In the following, these components of the engine 131 will be described in order.

<Engine Body 133>

With reference to FIGS. 8 and 9, the engine body 133 includes a crankcase 137, a first cylinder bank 138 extending to a left front side from the crankcase 137, and a second cylinder bank 139 extending to a right front side from the crankcase 137.

A crankshaft 141 is rotatably supported by a central portion of the crankcase 137. The crankshaft 141 is configured to rotate around a rotation axis Y extending in the up-and-down direction. That is, the engine 131 consists of a vertical engine in which the rotation axis Y of the crankshaft 141 extends in the up-and-down direction. A power take-off shaft 142 (PTO shaft: an example of an output portion) is provided at a lower end of the crankshaft 141. The PTO shaft 142 protrudes downward from a lower surface 137*a* of the crankcase 137 and extends in the up-and-down direction. An attachment member 143 is fixed to a lower portion of a front surface of the crankcase 137 by a pair of left and right bolts (not shown).

An engine mount 144 is arranged below the crankcase 137. The crankcase 137 is attached to the work machine P via the engine mount 144. For example, the work machine P is a riding-type lawn mower.

Figure 10:
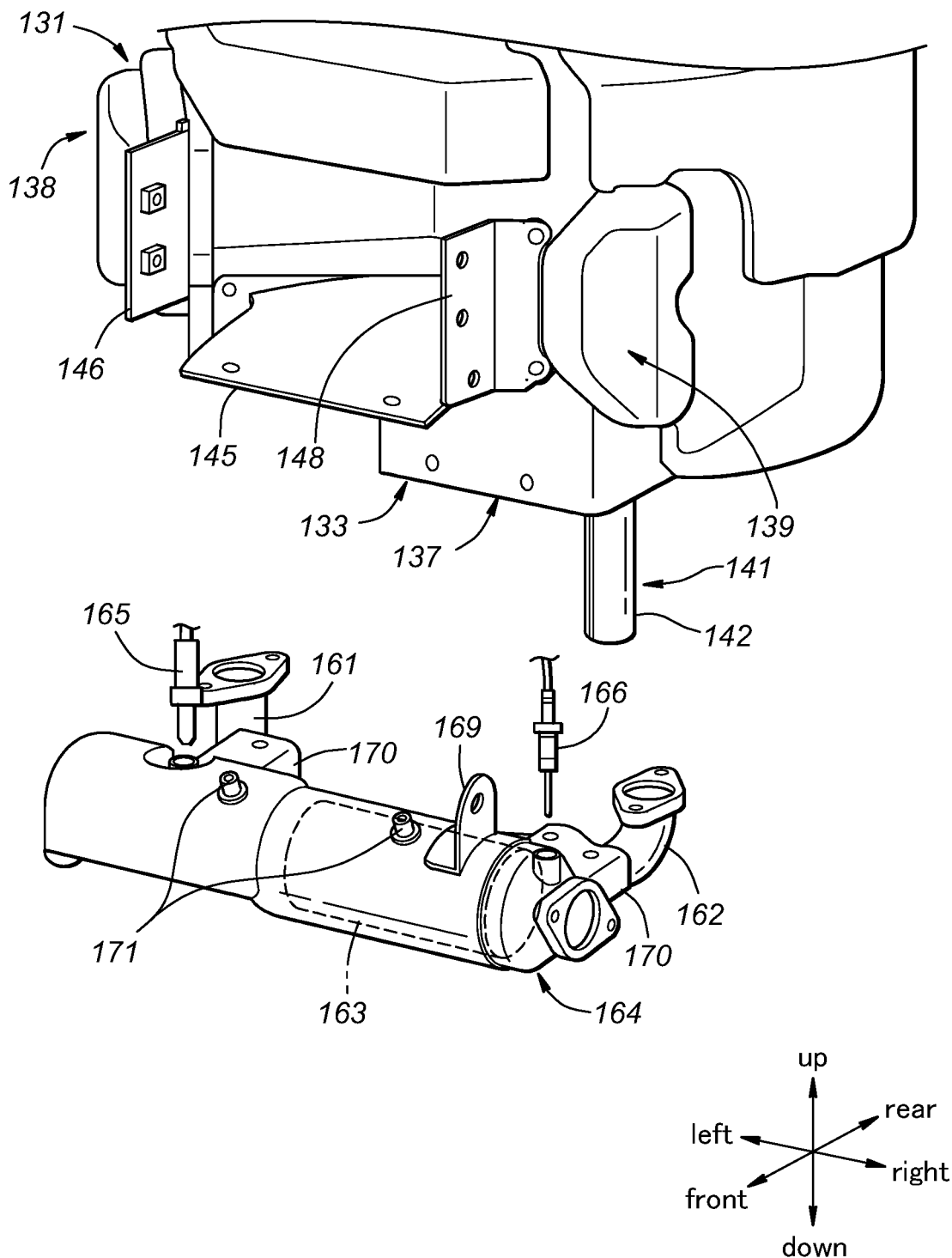
FIG. 10 is an exploded perspective view showing the V-type engine according to the second embodiment of the present invention.
Figure 11:
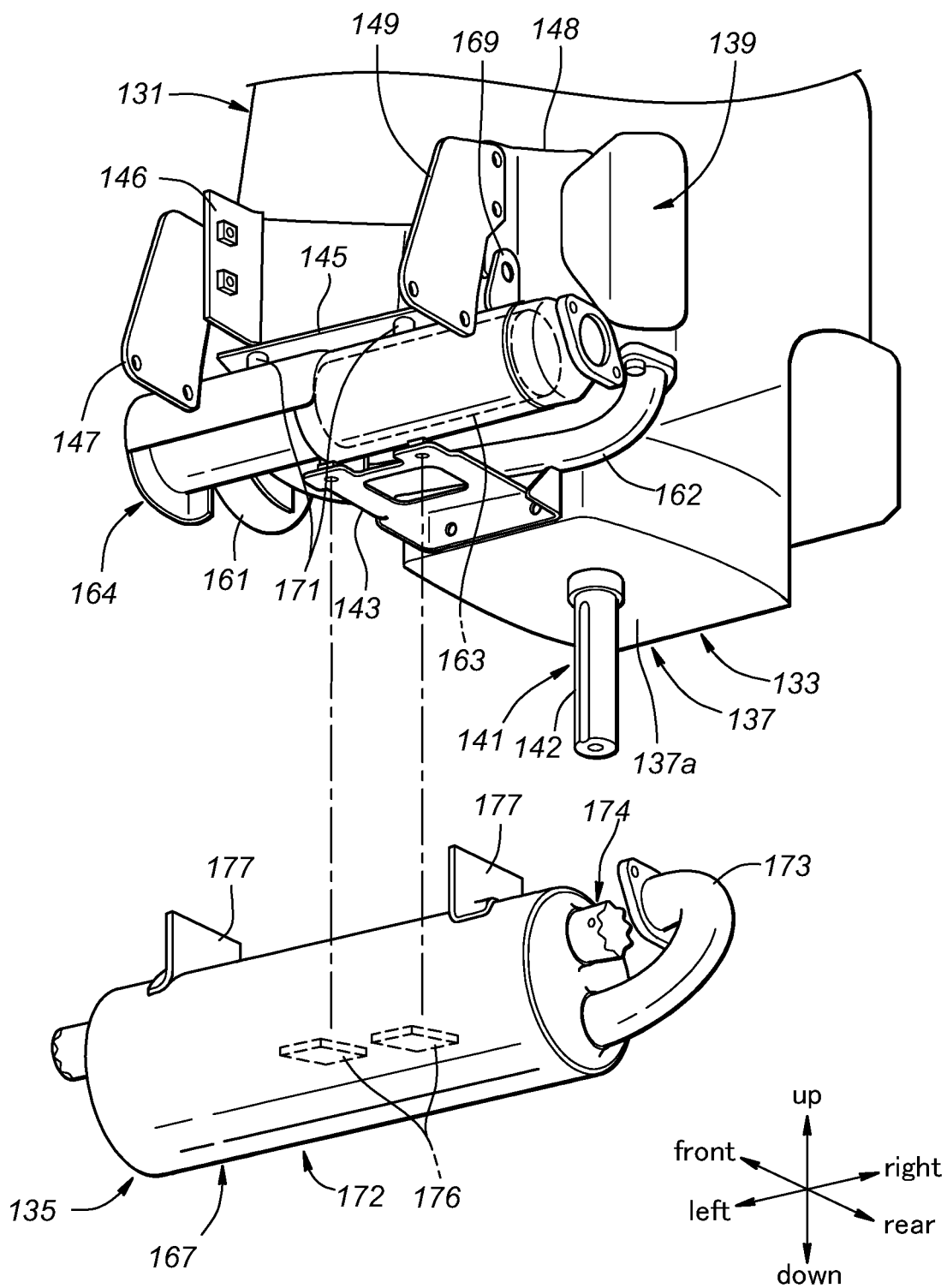
FIG. 11 is an exploded perspective view showing the V-type engine according to the second embodiment of the present invention.

With reference to FIGS. 10 and 11, a support plate 145 (an example of a support member) is fixed to the first and second cylinder banks 138 and 139 by a plurality of bolts (not shown). A first fixed plate 146 is fixed to the first cylinder bank 138 by a pair of bolts (not shown). A first connecting plate 147 is fixed to the first fixed plate 146 by a pair of bolts (not shown). A second fixed plate 148 (an example of a fixed member) is fixed to the second cylinder bank 139 by a pair of bolts (not shown). A second connecting plate 149 is fixed to the second fixed plate 148 by a pair of bolts (not shown).

<Air Cleaner 134>

With reference to FIG. 8, the air cleaner 134 has a cylindrical shape (canister-like shape) extending in the lateral direction. The air cleaner 134 is not arranged between the first and second cylinder banks 138 and 139 of the engine body 133, and arranged higher than the first and second cylinder banks 138 and 139.

<Exhaust Device 135>

With reference to FIGS. 10 and 11, the exhaust device 135 includes first and second exhaust pipes 161, 162, a catalyst 163, a catalyst pipe 164, an oxygen sensor 165, a temperature sensor 166, and a muffler 167.

<Catalyst Pipe 164>

With reference to FIG. 8, the catalyst pipe 164 of the exhaust device 135 is arranged on a front side of the first and second cylinder banks 138 and 139 and separated from the air cleaner 134 in the up-and-down direction. The catalyst pipe 164 is arranged higher than the lower surface 137*a* of the crankcase 137.

With reference to FIGS. 10 and 11, in a right portion (one side portion in the longitudinal direction) of an outer circumferential surface of the catalyst pipe 164, a fixed stay 169 protrudes upward. The fixed stay 169 is fixed to the second fixed plate 148 by a bolt (not shown). In both lateral portions (both side portions in the longitudinal direction) on an outer circumferential surface of the catalyst pipe 164, a pair of left and right fixed pieces 170 protrude rearward. The left fixed piece 170 is fixed to the first cylinder bank 138 by a bolt (not shown). The right fixed piece 170 is fixed to the second cylinder bank 139 by a pair of bolts (not shown). In both lateral portions on the outer circumferential surface of the catalyst pipe 164, a pair of bosses 171 are provided. The pair of bosses 171 are fixed to the support plate 145 by a pair of bolts (not shown).

<Muffler 167>

With reference to FIG. 11, like the muffler 41 according to the first embodiment, the muffler 167 of the exhaust device 135 includes a muffler body 172, a plurality of partition walls (not shown), an inflow pipe 173, a communication pipe (not shown), and a discharge pipe 174.

In a laterally central portion on an outer circumferential surface of the muffler body 172, a pair of left and right fixed brackets 176 protrude rearward. The pair of left and right fixed brackets 176 are fixed to the attachment member 143 by a pair of left and right bolts (not shown). In both left and right portions on the outer circumferential surface of the muffler body 172, a pair of left and right fixed stays 177 protrude upward. The left fixed stay 177 is fixed to the first connecting plate 147 by a pair of bolts (not shown). The right fixed stay 177 is fixed to the second connecting plate 149 by a pair of bolts (not shown).

<Effect of the Second Embodiment>

The PTO shaft 142 protrudes from the lower surface 137a of the crankcase 137, and the catalyst pipe 164 is arranged higher than the lower surface 137a of the crankcase 137. According to such a configuration, in the vertical engine 131, it is possible to prevent the catalyst pipe 164 from protruding lower than the lower surface 137a of the crankcase 137. Accordingly, it is possible to prevent the catalyst pipe 164 from interfering with the engine mount 144.

Further, the fixed stay 169 fixed to the second fixed plate 148 is provided in a right portion (one side portion in the longitudinal direction) of the catalyst pipe 164, and the pair of left and right fixed pieces 170 fixed to the first and second cylinder banks 138 and 139 and the pair of left and right bosses 171 fixed to the support plate 145 are provided on both lateral sides (both sides in the longitudinal direction) of the catalyst pipe 164. According to such a configuration, the catalyst pipe 164 can be fixed to the engine body 133 in a well-balanced manner with a simple configuration. Accordingly, it is not necessary to fix the catalyst pipe 164 to a frame around the engine body 133, so that the fixing operation of the catalyst pipe 164 can be facilitated.

Concrete embodiments of the present invention have been described in the foregoing, but the present invention should not be limited by the foregoing embodiments and various modifications and alterations are possible within the scope of the present invention.

GLOSSARY OF TERMS

First Embodiment

1: V-type engine
3: engine body
4: air cleaner
7: crankcase
7a: rear surface of the crankcase
8: first cylinder bank
9: second cylinder bank
11: crankshaft
12: PTO shaft (an example of an output portion)
19: exhaust port
21: temperature sensor
31: first exhaust pipe
32: second exhaust pipe
33: catalyst
34: catalyst pipe
35: oxygen sensor
37: first reinforcement member
38: second reinforcement member
39: thermal insulation member
41: muffler
58: first inlet port
59: second inlet port
66: outlet port
67: connecting flange
W: width of the engine body
X: rotation axis of the crankshaft Second Embodiment 131: V-type engine
133: engine body
137: crankcase
137a: lower surface of the crankcase
138: first cylinder bank
139: second cylinder bank
141: crankshaft
142: PTO shaft (an example of an output portion)
145: support plate (an example of a support member)
148: second fixed plate (an example of a fixed member)
164: catalyst pipe
169: fixed stay
170: fixed piece
171: boss
Y: rotation axis of the crankshaft

What is claimed is:
1. A V-type engine, comprising:
an engine body including
a crankcase configured to rotatably support a crankshaft, and
a pair of cylinder banks extending from the crankcase;
a pair of exhaust pipes connected to the pair of cylinder banks;
a catalyst pipe connected to the pair of exhaust pipes; and
a catalyst accommodated in the catalyst pipe,
wherein each of the pair of exhaust pipes is connected to the catalyst pipe on an upstream side of the catalyst in an exhaust direction, and
the catalyst pipe is arranged adjacently to the pair of cylinder banks,
wherein the catalyst pipe extends in a width direction of the engine body from a distal end side of one of the cylinder banks to a distal end side of another of the cylinder banks, and
each of the pair of exhaust pipes is connected to the catalyst pipe on one side of the catalyst in the width direction of the engine body that is perpendicular to an axial direction of the crankshaft, the width direction of the engine body being a direction in which the pair of cylinder banks are aligned.
2. The V-type engine according to claim 1, wherein the catalyst pipe is arranged within a width of the engine body when viewed in the axial direction of the crankshaft.

3. The V-type engine according to claim 1, wherein the crankshaft is configured to rotate around a rotation axis extending in a horizontal direction,
- an output portion of the crankshaft protrudes from a side surface of the crankcase, and
- the catalyst pipe is arranged above the output portion, and protrudes more sideward than the side surface of the crankcase.

4. The V-type engine according to claim 1, wherein the crankshaft is configured to rotate around a rotation axis extending in an up-and-down direction,
- an output portion of the crankshaft protrudes from a lower surface of the crankcase, and
- the catalyst pipe is arranged higher than the lower surface of the crankcase.

5. The V-type engine according to claim 1, further comprising:
- a support member fixed to the pair of cylinder banks; and
- a fixed member fixed to one of the cylinder banks,
- wherein one side portion of the catalyst pipe in a longitudinal direction thereof is provided with a fixed stay fixed to the fixed member, and
- both side portions of the catalyst pipe in the longitudinal direction thereof are provided with:
  - a pair of fixed pieces fixed to the pair of cylinder banks; and
  - a pair of bosses fixed to the support member.

6. The V type engine according to claim 1,
- further comprising an oxygen sensor configured to detect oxygen concentrations of an exhaust gas discharged from the pair of exhaust pipes,
- wherein the catalyst pipe is provided with a pair of inlet ports to which the pair of exhaust pipes are connected, the pair of inlet ports being arranged at an interval in the width direction of the engine body, and
- the oxygen sensor is arranged between the pair of inlet ports with respect to the width direction of the engine body, and attached to a surface of the catalyst pipe facing the pair of inlet ports.

7. The V-type engine according to claim 1, wherein an exhaust port opens on each of the cylinder banks, and
- an inner diameter of the pair of exhaust pipes and an inner diameter of the catalyst pipe are larger than an inner diameter of the exhaust port.

8. The V-type engine according to claim 1, wherein each of the cylinder banks is provided with a temperature sensor configured to detect a temperature thereof.

9. A V-type engine, comprising:
- an engine body including
  - a crankcase configured to rotatably support a crankshaft, and
  - a pair of cylinder banks extending from the crankcase;
- a pair of exhaust pipes connected to the pair of cylinder banks;
- a catalyst pipe connected to the pair of exhaust pipes; and
- a catalyst accommodated in the catalyst pipe,
- wherein each of the pair of exhaust pipes is connected to the catalyst pipe on an upstream side of the catalyst in an exhaust direction, and
- the catalyst pipe is arranged adjacently to the pair of cylinder banks,
- wherein the catalyst pipe extends in a width direction of the engine body from a distal end side of one of the cylinder banks to a distal end side of another of the cylinder banks, and
- each of the pair of exhaust pipes is connected to the catalyst pipe on one side of the catalyst in the width direction of the engine body,
- the V-type engine further comprising:
- an air cleaner arranged between the pair of cylinder banks; and
- a thermal insulation member arranged between the catalyst pipe and the air cleaner,
- wherein the thermal insulation member is a plate member fixed to the catalyst pipe and the pair of cylinder banks.

10. The V-type engine according to claim 9, further comprising:
- a first reinforcement member fixed to the pair of exhaust pipes; and
- a second reinforcement member fixed to the catalyst pipe and one of the exhaust pipes,
- wherein the thermal insulation member is fixed to the pair of cylinder banks together with the first reinforcement member and the second reinforcement member.

\* \* \* \* \*